United States Patent
Hoversten et al.

(10) Patent No.: US 8,882,892 B2
(45) Date of Patent: Nov. 11, 2014

(54) POWDER COATING SYSTEM HAVING POWDER RECOVERY CYCLONE WITH HINGED LOWER SECTION

(71) Applicant: Nordson Corporation, Westlake, OH (US)

(72) Inventors: William R. Hoversten, Cuyahoga Falls, OH (US); Sirirat Sangwian, Shaker Heights, OH (US); Jeffrey R. Shutic, Wakeman, OH (US)

(73) Assignee: Nordson Corporation, Westlake, OH (US)

( * ) Notice: Subject to any disclaimer, the term of this patent is extended or adjusted under 35 U.S.C. 154(b) by 75 days.

(21) Appl. No.: 13/757,908

(22) Filed: Feb. 4, 2013

(65) Prior Publication Data

US 2014/0216333 A1   Aug. 7, 2014

(51) Int. Cl.
*B01D 45/12*   (2006.01)
*B05C 19/06*   (2006.01)

(52) U.S. Cl.
CPC .................. *B05C 19/06* (2013.01); *Y10S 55/03* (2013.01); *Y10S 55/46* (2013.01)
USPC .................. 95/271; 55/356; 55/429; 55/428; 55/459.1; 55/DIG. 3; 55/DIG. 46; 55/432; 55/433

(58) Field of Classification Search
CPC .......... B01D 45/16; B01D 45/12; B04C 5/04; B04C 5/13; B04C 5/02; B04C 5/081; B04C 5/12; B04C 5/16; B04C 9/00; B05D 2401/32
USPC ............... 55/356, 429, 428, DIG. 3, DIG. 46, 55/459.1, 43; 95/271
See application file for complete search history.

(56) References Cited

U.S. PATENT DOCUMENTS

| | | | |
|---|---|---|---|
| 2,534,702 A * | 12/1950 | Driessen | 55/460 |
| 3,197,955 A | 8/1965 | Cohn et al. | |
| 4,133,658 A | 1/1979 | Callewyn | |
| 6,080,217 A | 6/2000 | Gobl et al. | |
| 7,189,272 B2 | 3/2007 | Cheng | |
| 2002/0134306 A1* | 9/2002 | Baroncini et al. | 118/621 |
| 2009/0209403 A1* | 8/2009 | Conrad | 494/63 |

OTHER PUBLICATIONS

Non-Final Office Action dated Jan. 7, 2014, for U.S. Appl. No. 14/025,021.

(Continued)

*Primary Examiner* — Dung H Bui
(74) *Attorney, Agent, or Firm* — Calfee, Halter & Griswold LLP

(57) ABSTRACT

A cyclone comprises a second or lower portion that is pivotable with respect to a first or upper portion about an articulation between a first position and a second position; the second portion being aligned with the first portion along a first or vertical axis when the second portion is in the first position, and the second portion being aligned on a second axis that is different from the first axis when the second portion is moved from the first position to the second position. In various additional embodiments, the second axis may be normal to the first axis, for example, in the first position the lower portion is horizontal and in the first position the lower portion is vertical and aligned with the upper portion. The second position may be used as a cleaning position. When the lower portion is pivoted away from the upper portion, the vortex is interrupted. In the second position, the lower portion may also interface with a suction mechanism.

18 Claims, 13 Drawing Sheets

(56) References Cited

OTHER PUBLICATIONS

Non-Final Office Action mailed Feb. 14, 2013, for corresponding U.S. Appl. No. 13/285,452.

Response to Office Action filed May 13, 2013, in response to Non-Final Office Action mailed Feb. 14, 2013, for corresponding U.S. Appl. No. 13/285,452.

* cited by examiner

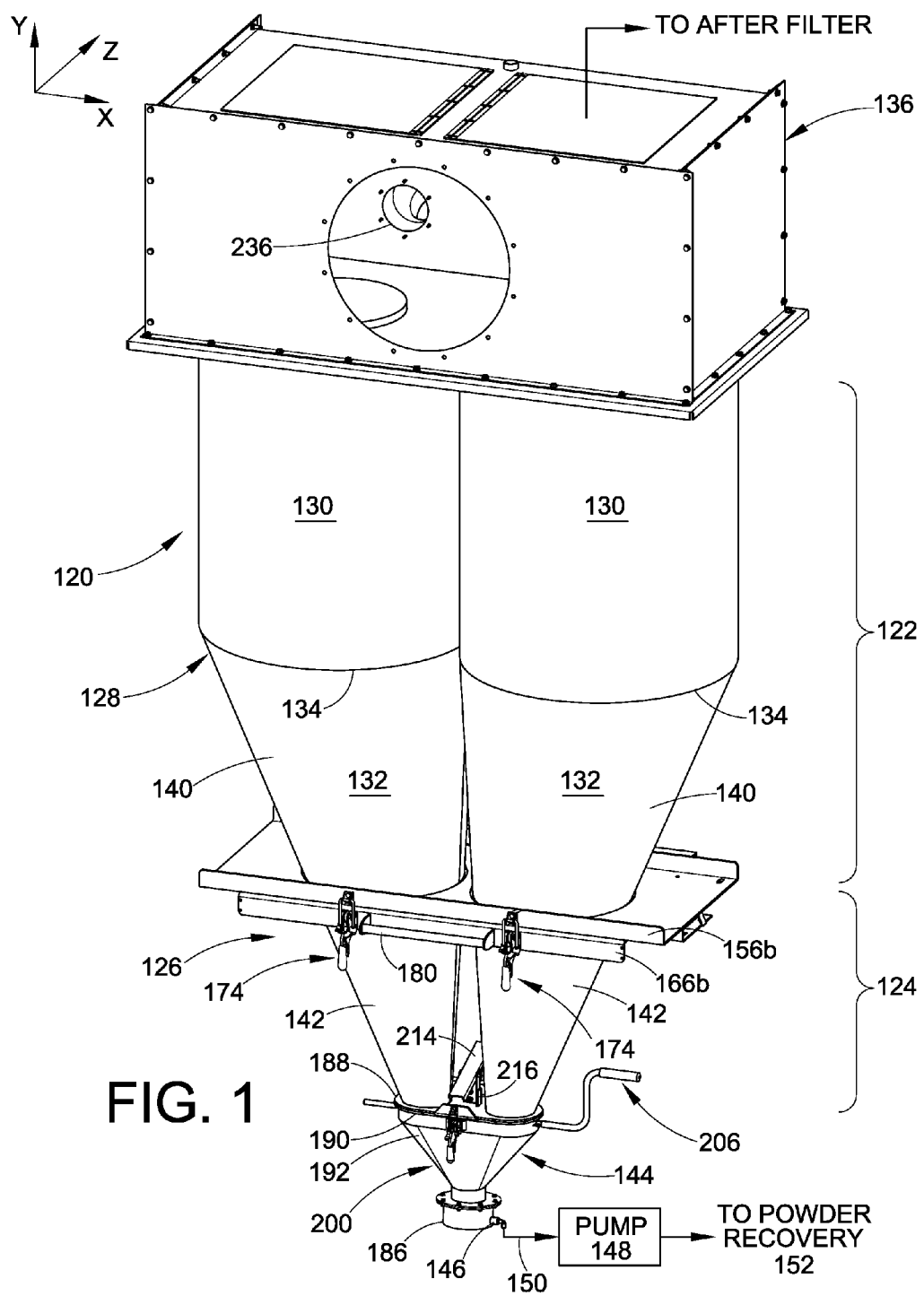

POWDER COATING SYSTEM HAVING POWDER RECOVERY CYCLONE WITH HINGED LOWER SECTION

TECHNICAL FIELD OF THE DISCLOSURE

The inventions relate generally to powder recovery cyclone separators such as may be used with powder coating systems and processes. More particularly, the inventions relate to a powder recovery cyclone separator that is constructed in two portions so that the two portions can be manipulated easily for cleaning and other maintenance activities, and to the use of such a powder recovery cyclone in a powder coating system.

BACKGROUND OF THE DISCLOSURE

Powder coating materials are typically applied to objects or workpieces by spray application apparatus and processes. These spray application apparatus and processes include electrostatic and non-electrostatic processes as are well known. Spray application of powder coating material to workpieces often is done in a spray booth that is used to contain and recover powder overspray that does not adhere to the workpieces during a powder coating operation. Powder overspray may be recovered from the booth and either recycled back to the feed center for re-use or otherwise disposed to waste or other uses. A powder cyclone separator is commonly used as part of a powder recovery system whereby powder overspray entrained air is drawn from the spray booth through duct work into a cyclone separator which operates to remove powder that is entrained in the air volume. The separated powder falls to the bottom of the powder cyclone separator where it is then transferred to a receptacle. One of the more significant aspects of any powder coating system is a powder coating material change operation and the associated system down time and labor involved in such changeovers. For example, when the color of the applied powder needs to be changed, the entire system must be cleaned and purged of the just used color before the next color can be applied. This involves the need to clean and purge the spray guns, feed hoses, the spray booth and the cyclone separator.

SUMMARY OF THE DISCLOSURE

In accordance with an aspect of the disclosure herein, an exemplary embodiment of a cyclone comprises a first or upper portion and a second or lower portion. The cyclone upper portion and the cyclone lower portion are joined or mechanically connected together by an articulation. The cyclone lower portion is pivotable with respect to the upper portion by movement about the articulation. The cyclone may optionally be supported on a frame.

In another embodiment, a cyclone comprises a second or lower portion that is pivotable with respect to a first or upper portion about an articulation between a first position and a second position; the second portion being aligned with the first portion along a first or vertical axis when the second portion is in the first position, and the second portion being aligned on a second axis that is different from the first axis when the second portion is moved from the first position to the second position. In an additional embodiment, the second axis may be normal to the first axis, for example, in the first position the second portion is horizontal and in the first position the second portion is vertical and aligned with the first portion.

In another embodiment, a cyclone comprises a second or lower portion that is pivotable with respect to a first or upper portion about an articulation between a first position and a second position; the second portion being aligned with the first portion along a vertical axis when the second portion is in the first position, and the second portion being aligned on a second axis that is different from the vertical axis when the second portion is moved from the first position to the second position. When the second portion is in the second position, vortex operation of the cyclone is interrupted. The vortex operation may become interrupted at a transition position between the first position and the second position.

In another embodiment, a cyclone includes a first or upper portion and a second or lower portion. The upper portion and the lower portion are joined together by an articulation. The lower portion is pivotable with respect to the upper portion by movement about the articulation. The lower portion is pivotable with respect to the upper portion about the articulation between a first position and a second position; the second portion being aligned with the first portion along a first axis when the second portion is in the first position, and the second portion being aligned on a second axis that is different from the first axis when the second portion is moved from the first position to the second position. When the second portion is in the second position, an outlet of the second portion is open to a suction mechanism, for example, an exhaust duct.

In another embodiment, a cyclone of the type described is used in a powder coating system.

In accordance with another aspect of the disclosure herein, an embodiment of a method for cleaning a cyclone separator used in a powder recovery system may include the steps of providing suction for the cyclone, swinging a lower portion of the cyclone away from an upper portion so that an outlet of the lower portion is presented to and open to a suction mechanism, and cleaning an interior surface of a lower portion of the cyclone with the powder being drawn into the suction mechanism. The methods described herein may be used, for example, during a color change operation.

These and other aspects and advantages of the inventions, embodiments and the disclosure herein will be readily understood and appreciated from the following detailed description hereinafter and the accompanying drawings.

BRIEF DESCRIPTION OF THE DRAWINGS

FIG. 1 is a front perspective of an embodiment of a powder cyclone separator in accordance with the present disclosure;

DETAILED DESCRIPTION OF THE EXEMPLARY EMBODIMENTS

Figure 1A:
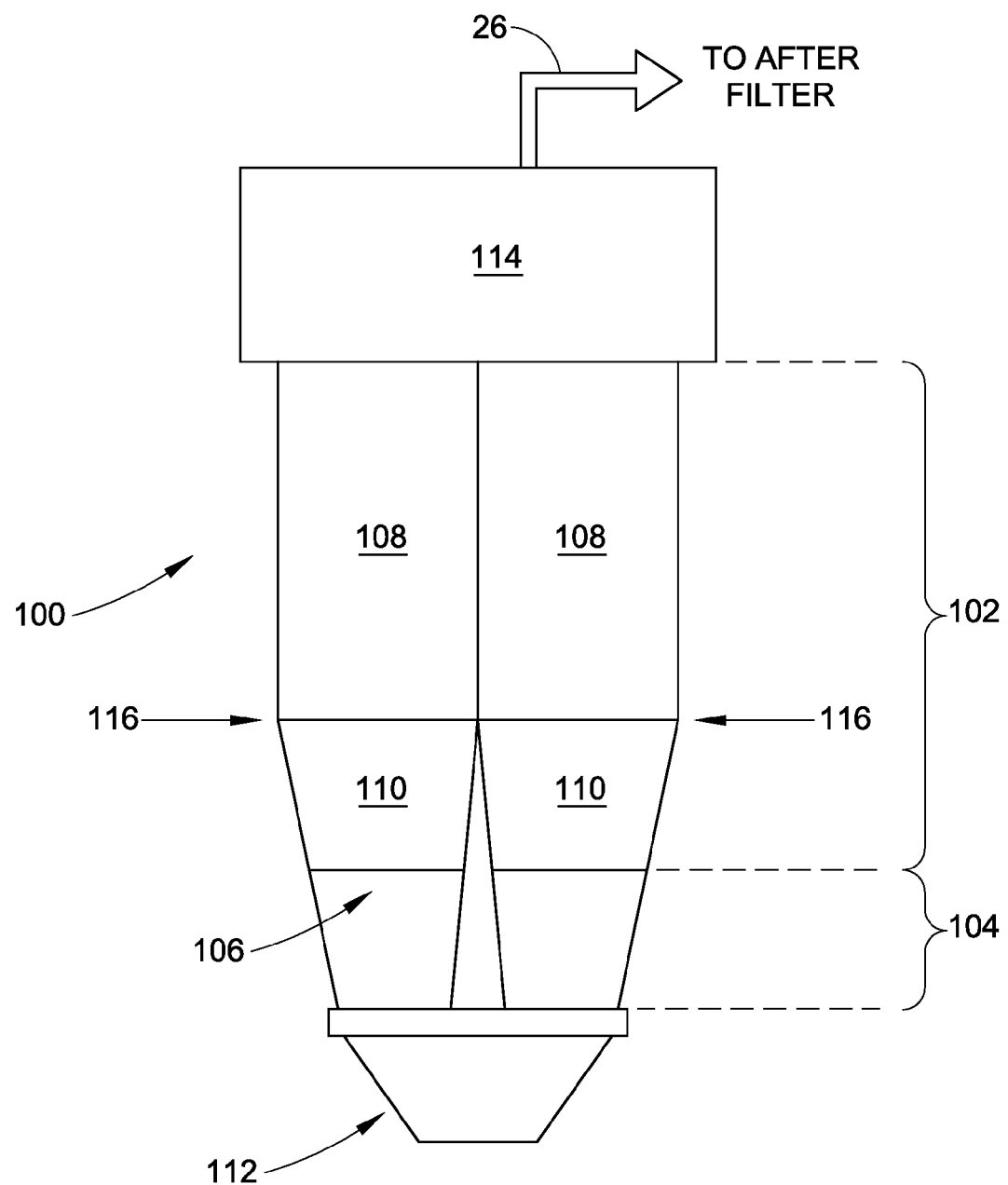
FIG. 1A is a schematic representation of a twin cyclone embodiment in accordance with the present disclosure.

Although the various embodiments herein illustrate a particular form and structure of a powder recovery cyclone separator, also referred to herein as a cyclone, the various inventions may be used alone, in various combinations and/or collectively with different cyclone designs. The basic structural features of a cyclone that the present disclosure utilizes is a first or upper portion that typically is cylindrical and a second or lower portion that typically is conical. A cyclone may have many other optional structural features which form no required structure in order to practice the inventions herein. Conventionally, the upper portion includes an intake section that receives a flow of powder entrained air at a tangential inlet to the intake section, and a powder recovery section through which cyclonically separated powder falls to an outlet. All other exemplary embodiments herein of various components of a cyclone or a powder coating system, such as but not limited to the spray booth, feed center, spray guns and so on are optional design features that may be selected for a particular spray coating operation or processes. In other words, the cyclone concepts disclosed herein may be used with a wide variety of cyclone and system features including a feed center for supplying powder coating material, spray guns, electronic control systems for the spray booth, spray guns, gun control systems, gun movers, reciprocators, oscillators, overhead conveyor systems, and so on. The inventions also are not limited to any particular spray technology, and may include but not limited to electrostatic, tribo-electric, non-electrostatic, hybrid technologies, as well as automatic and manual application systems, as well as being used with dense phase and/or dilute phase powder conveyance technologies.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Introduction

Figure 12:
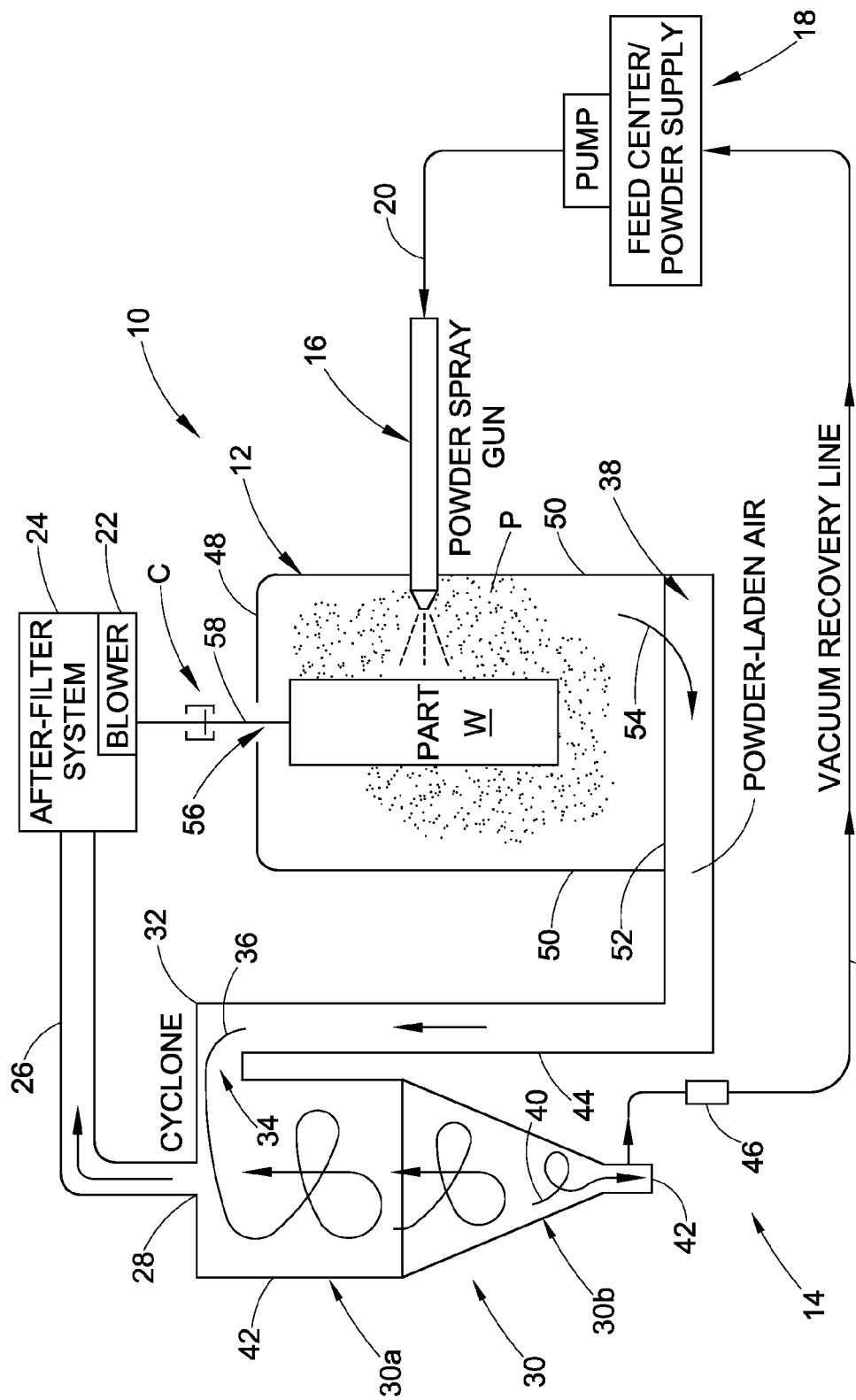
FIG. 12 illustrates a prior art powder coating system such as may be used with the present inventions and embodiments presented in this disclosure.

FIG. 12 illustrates a prior art powder coating material application system 10 that includes a spray booth 12 and a powder overspray recovery system 14. The spray booth 12 in this embodiment may be supported on a structural frame (not shown) above the shop floor. We describe a prior art powder coating system to provide context for understanding the present inventions, but the present inventions may be used with many different powder coating systems, either those known or later developed. The present disclosure, embodiments and inventions are directed to the cyclone separator as will be fully described hereinbelow. For further reference, a spray booth that may be used with the concepts of the present inventions is described in U.S. Pat. No. 7,014,556, the entire disclosure of which is fully incorporated herein by reference. Many other spray booth design alternatives, however, may be used.

Typically, a plurality of powder coating material application devices 16 such as, for example, a spray gun, are used to coat workpieces W with powder coating material P as the workpieces W advance through the spray booth 12 interior. These application devices 16 may include automatic and manual spray guns, for example. Automatic spray guns often are mounted on a gun mover system (not shown) which may include a reciprocator or oscillator. The gun mover system may be used to both extend and retract the spray guns with respect to the spray booth 12 and also may be used to produce an up/down oscillatory motion of the guns during a coating operation. The spray guns 16 may be selected from any number of spray gun designs, including but not limited to an ENCORE® spray gun available from Nordson Corporation, Westlake, Ohio. The spray guns 16 may be electrostatic, non-electrostatic, tribo-charging or other designs and spraying technology may be used. A series of vertical gun slots or openings in the spray booth walls may be provided for automatic spray guns, and the spray booth 12 may also include other openings through which an operator can manually spray workpieces.

A feed center 18 may be provided that contains a supply of powder coating material P that will be applied the workpieces within the spray booth 12. The feed center 18 for example may include any number of hoppers, boxes or other containers of powder, along with suitable pumps and hoses to feed material to the one or more spray guns 16. A powder hose 20 connects a powder input of the spray gun 16 to an output of a powder pump (not shown) which may be located in the feed center 18 or other convenient location. Not all powder coating systems utilize a feed center and in other embodiments, powder coating material may be supplied to the spray gun 16 simply using a pump that draws powder from a box or hopper or other container. An example of a feed center 18 is described in U.S. Pat. No. 7,325,750 for POWDER COATING SYS- TEM WITH IMPROVED OVERSPRAY COLLECTION, issued Feb. 5, 2008, and also United States published patent application no. US 2008/0017103 A1 for SUPPLY FOR DRY PARTICULATE MATERIAL which was published on Jan. 24, 2008; the entire disclosures of which are fully incorporated herein by reference. However, many different feed centers or other supplies for powder coating material may be used as needed. The 7,325,750 feed center may, for example, be used with Venturi type pumps for dilute phase systems and the 2008/0017103 feed center may be used, for example, with dense phase pumps for dense phase systems. But the present inventions may be used with dense phase or dilute phase pumps and powder spray systems.

A suitable operator interface to a control system (not shown) may be provided to control operation of the spray guns 16, the powder recovery system 14, the spray booth 12 including an overhead conveyor C, the gun mover system, gun controls, feed center and pump controls and so on, as is well known to those skilled in the art and need not be described herein to understand and practice the present inventions. The control system and the operator interface may be selected from any number of well known control system concepts as are well known to those skilled in the art, or specifically designed for a particular system.

In the example of FIG. 12, the powder overspray recovery system 14 is realized in the form of a powder cyclone separator. Depending on how much powder overspray needs to be extracted from the spray booth, or the geometric constraints of the system, a single cyclone, twin cyclone or more cyclones alternatively may be used. In the exemplary embodiments herein, we illustrate a twin cyclone configuration, but the inventions and concepts herein may optionally be used with a single cyclone configuration.

A blower and after filter system 23 may include an after filter arrangement 24 and a suction fan 22 that are in fluid communication through a duct 26 with an exhaust outlet 28 of the cyclone 30, and provide the energy and air flow required to generate a vortex (36) within the cyclone 30 for operation of the cyclone powder recovery system 14. The fan 22 produces suction that draws a large air flow into the cyclone 32, in the form of a substantial powder entrained air flow pulled from the spray booth 12 interior, to an intake duct 32 of the cyclone. The cyclone 30 commonly includes a tangential inlet 34 (relative to a vertical axis of the cyclone) to cause the familiar cyclonic circulation or vortex 36 that causes separation of powder from the air.

The air flow produced by the powder recovery system 14 also produces a substantial flow of air into and through the spray booth 12, sometimes referred to as containment air. The containment air flow prevents the loss of powder overspray outside the spray booth 12. Powder overspray that does not adhere to the workpiece W during a powder coating operation falls by gravity and also may be assisted to flow by the containment air into a recovery duct 38. This recovery duct 38 may be below the spray booth floor, for example. However, many designs are available for providing fluid communication between the spray booth 12 and the cyclone inlet 34 that do not use a subfloor duct. The powder entrained air is thus drawn into the cyclone 30 during operation of the fan 22.

Typically, the after filter system 24 and fan 22 draw a substantial flow of powder entrained air into the cyclone 30 and the separated powder descends as indicated by the arrows 40 to a cyclone outlet 42. From the cyclone outlet 42 the recovered powder may be returned to the feed center 18 or otherwise dumped to waste or reclaimed in some other manner. The powder entrained air that is pulled into the cyclone tangential inlet 34 via the intake duct 32 may be drawn through a vertical extraction duct 44.

Powder overspray that has been separated by the cyclone 30 may be recovered from the cyclone outlet 42 and returned to the feed center 18, as is commonly done if the powder will be reused, or alternatively may be conveyed to another container or receptacle or dumped to waste. A transfer pump 46 may be used to pull the recovered powder from the outlet 42 of the cyclone 30 to transfer the powder back to the feed center 18 through a transfer powder hose 60 or otherwise disposed. The cyclone 30 may include an optional transfer pan (not shown in FIG. 12) that provides an interface between the transfer pump 46 and the cyclone outlet 42 for collection of the powder that falls from the cyclone 30 interior. A transfer pan is commonly used in twin cyclone configurations as well.

The spray booth 12 may be generally rectangular in shape although other shapes and configurations may conveniently be used. A spray booth 12 will typically have a longitudinal horizontal axis X into the plane of the drawing for FIG. 12, which is typically the axis along which the conveyor C moves the workpieces W through the spray booth 12. The spray booth 12 may have a ceiling 48 supported by one or more vertical sides or walls 50, and a floor 52. As represented by the arrow 54, powder overspray tends to fall to the floor 52 and pass through openings, duct work or other openings in or around the floor 52 to an exhaust opening that is in fluid communication with the recovery duct 38. The ceiling 48 may include an overhead conveyor slot 56 that allows hangers 58 to extend from the conveyor C to suspend workpieces inside the spray booth 12 interior.

All of the panels for the spray booth structure, including by not limited to the floor 52, ceiling 48, walls 50 and so on may each be made of composite materials including a foam core panel and gelcoat inner surface such as sold by Nordson Corporation in powder coating booths as an Apogee® panel structure. Other materials may alternatively be used as required, for example, PVC walls and panels. The Apogee® panel construction is also described in U.S. Pat. No. 6,458,209 for POWDER COATING BOOTH CONTAINMENT STRUCTURE issued to Shutic, Oct. 1, 2002, the entire disclosure of which is fully incorporated herein by reference.

DETAILED DESCRIPTION

It should be noted that the schematic representation of the cyclone 30 in FIG. 12 highlights a feature of traditional powder cyclone separators such as are used in known powder coating systems. That feature is the final assembled construction of the cyclone as a single or unitary structure with respect to the powder intake and separation structure. In other words, a traditional cyclone 30 includes a cylindrical intake upper portion 30a and a conical separator lower portion 30b, but these portions are made of substantial metal walls like a shell that are integral, or not easily separable, after final assembly, and would not be deconstructed once the cyclone is installed in a facility for normal use. Even though the traditional conical separator lower portion 30b may be provided with one or more access doors (not shown in FIG. 12) for cleaning the cyclone interior, it is very difficult to clean the upper reaches of the cylindrical intake upper portion 30a. Cyclone separators used with powder coating systems are large volume structures and may extend 20 feet or higher above the shop floor. This makes access to the upper interior surfaces, especially internal cones and other surfaces near the exhaust outlet 28, difficult visually to observe and clean. The conventional use of access doors on the conical structure or shell presents a difficult manufacturing challenge and cost factor.

An important feature of powder coating systems is the time and effort involved during color change operations. Color change refers generally to cleaning operations that are performed in order to avoid or minimize contamination of a subsequent powder type when a previous powder type was used during powder coating operations. Cleaning commonly involves removing all powder overspray from the spray booth, powder ducts, powder recovery systems such as a cyclone, purging the spray guns, feed hoses and so on. Any powder remaining in the system can contaminate and compromise coating operations using a different type of powder. Color change also generally refers to powder change for different powders other than just different colors. For example, changing between organic powders and metallic or porcelain enamel powders.

Turning to FIG. 1A, in accordance with our inventions, we illustrate an embodiment of a powder cyclone separator 100 (also referred to herein as a cyclone) that may be used with a powder coating system, for example the embodiment of FIG. 12 herein or others, that is easier and faster to clean and easier and faster to verify that all interior surfaces have been cleaned. This can significantly reduce color change times, for example, or other maintenance activities.

In an embodiment of a first of the concepts we present herein, a cyclone 100 is provided as two distinct portions, a first or upper portion 102 and a second or lower portion 104 that are joined together by an articulation 106. The articulation 106 allows the upper and lower portions 102, 104 of the cyclone 100 to be moved relative to each other. For example, the articulation 102 facilitates a pivoting motion of the upper and lower portions 102, 104 relative to each other. This relative movement allows the upper and lower portions 102, 104 to be positioned relative to each other to allow access to the interior surfaces of the cyclone 100 for better viewing and to improve the ability to clean the interior surfaces. The provision of an articulation 106 between the first portion 102 and the second portion 104 is, therefore, an embodiment of this first concept.

In FIG. 1A we illustrate a twin cyclone configuration, so that there are actually two upper portions 102 and two lower portions 104. Twin cyclones may be used, for example, to allow for high volume powder recovery while allowing the height of the cyclone 100 to be manageable. Alternatively, the inventions herein may be conveniently and easily adapted for use with a single cyclone as needed for a particular powder coating system.

The exemplary embodiments herein illustrate cyclone configurations in which the cyclone is vertically oriented during normal operational use as a powder separator. The concepts and inventions presented in this disclosure may also conveniently be used with other cyclone arrangements, for example, but not limited to, cyclones that are horizontally oriented during normal operational use.

A cyclone traditionally includes a cylindrical portion 108 and a conical portion 110. The cylindrical portion 108 is usually the powder flow intake portion and the conical portion 110 is usually the main separator portion, although powder can be separated from the air flow within the cylindrical portion 108 as well. The cyclone generates an internal vortex that causes the separation of the entrained powder from the air flow. The separated powder then drops to an outlet 112 of the cyclone where it can be removed. The air and any powder that is not separated by the cyclone is released through an upper exhaust section 114 to the after filter as described above and is well known.

FIG. 1A also illustrates an embodiment wherein the articulation 106 is provided in a portion of the cyclone 100 that is conical in shape. Although the embodiments illustrated herein show the articulation 106 as being provided in the conical portion 110 of the cyclone, such is not necessarily required. For example, alternatively, the articulation 106 may be provided at a transition 116 between the cylindrical portion 108 and the conical portion 110 (so that the upper portion 102 and the cylindrical portion 108 would be the same structure, and the lower portion 104 and the conical portion 110 would be the same structure); or alternatively the articulation 106 may be provided at some other convenient location. In any case, the articulation 106 may be provided to allow for the relative movement of the first or upper portion 102 and the second or lower portion 104 of the cyclone 100 regardless of where the articulation 106 is disposed.

An embodiment of a second concept of the disclosure herein provides for a suction mechanism to be coupled to or otherwise in fluid communication with the second or lower portion 104 of the cyclone to remove powder that is blown from the surfaces of the lower portion 104 during a cleaning operation. The lower portion 104 may be swung about the articulation 106 and into a position such that the lower portion 104 interfaces with the suction mechanism. Additional embodiments of the concept will be further described below.

An embodiment of a third concept of the disclosure herein provides a powder transfer section or other form of interface with an outlet of the cyclone 100, with the powder transfer section being joined to the second or lower portion 104 by a second articulation. The second articulation allows the powder transfer interface to be swung to a position that presents the outlet of the cyclone 100 to a suction mechanism. Additional embodiments of the concept will be further described below.

An embodiment of a fourth concept of the disclosure herein provides a suction mechanism that interfaces with a second or lower portion 104 of the cyclone when the lower portion 104 has been articulated or moved from a first or operational position to a second or cleaning position relative to the first or upper portion 102. The suction mechanism may also be operably connected in fluid communication with the exhaust section 114 of the cyclone 100, so that the suction that is used to provide the energy to the cyclone to separate the powder from the air flow may also conveniently be used during a cleaning operation. Additional embodiments of the concept will be further described below.

An embodiment of a fifth concept of the disclosure herein provides an articulation between a first portion of the cyclone and a second portion of the cyclone. The articulation 106 allows the upper and lower portions 102, 104 of the cyclone 100 to be moved relative to each other. The relative movement provides a separation between the upper and lower portions 102, 104 which interrupts the vortex within the cyclone upper portion 102. Additional embodiments of the concept will be further described below.

Still referring to FIG. 1A, the upper and lower portions 102, 104 are mated together in a first position (the position of FIG. 1A) to form an operable cyclone 100 that will separate powder from air using the internally generated vortex. In a second position, the lower portion 104 can be swung away from the upper portion 102 such as with a pivoting motion, for example, about the articulation 106. This pivoting movement separates the upper and lower portions 102, 104, which interrupts the internal vortex and allows access to all the interior surfaces of the cyclone 100 for cleaning and visual inspection of interior surfaces. The amount of separation or alternatively the degree of pivoting movement or rotation may be selected as needed to interrupt the internal vortex based on the particulars of the cyclone design and operation. The exhaust air may continue to run throughout the cleaning operation to remove powder that is blown from the cyclone surfaces, for example, using an air wand or other convenient cleaning devices.

When we say that the upper and lower portions 102, 104 can be mated together, we mean that the upper and lower portions 102, 104 can be brought together in sufficiently close proximity so that an operational cyclone separator is presented. We do not mean to require or imply that mating the upper and lower portions 102, 104 means that the upper and lower portions 102, 104 are secured or fastened together although such is an alternative option, for example with easy release clamps or latches. As will be described in additional embodiments hereinbelow, we join the upper and lower portions 102, 104 to provide a sufficiently enclosed volume so that normal cyclonic function is available. This does not require, although we optionally provide, a sealed or an air tight mating interface between the upper and lower portions 102, 104, as will be appreciated from the below discussion.

Figure 2:
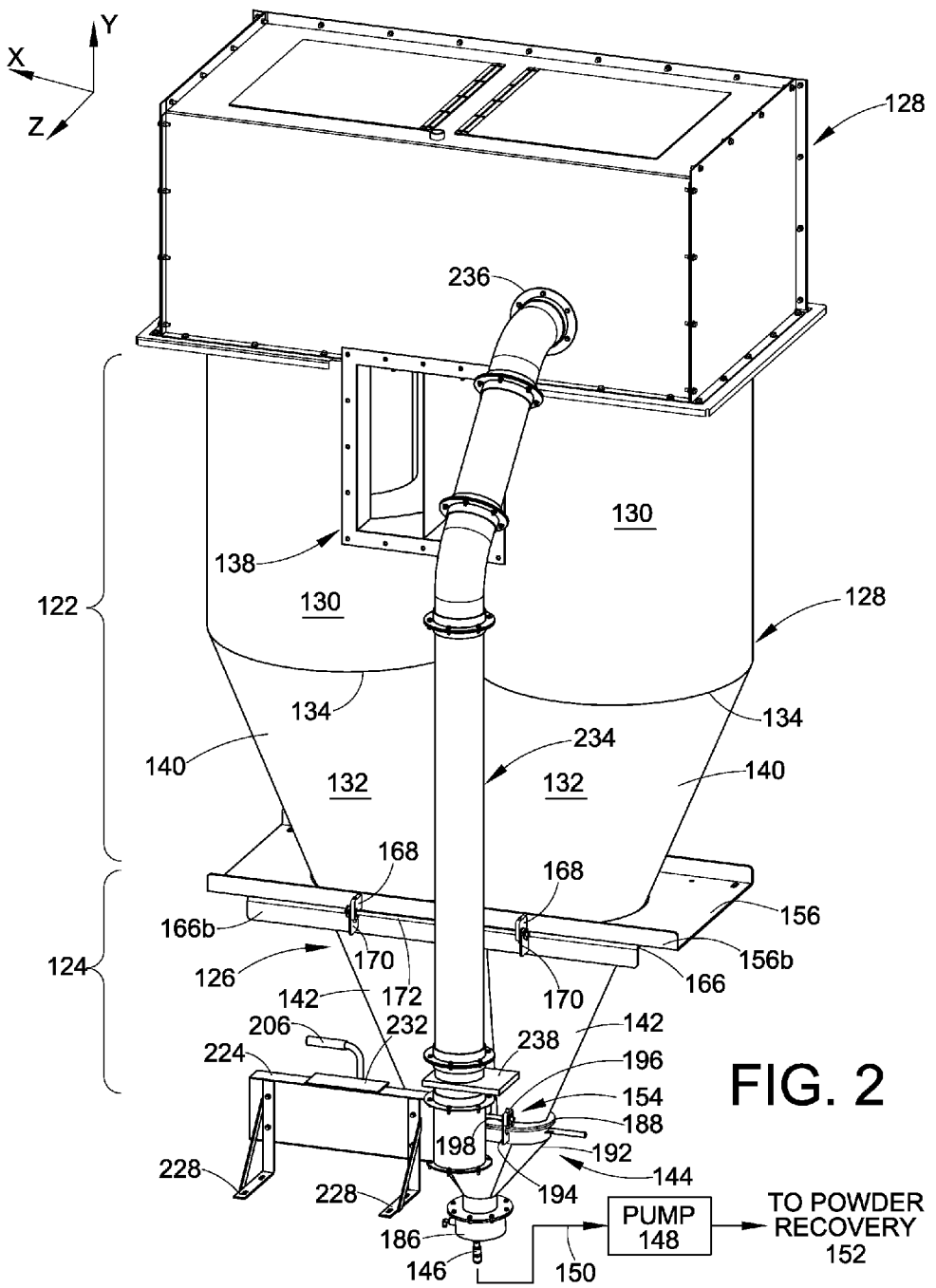
FIG. 2 is a rear perspective of the embodiment of FIG. 1.

The additional drawings herein illustrate additional and optional features and structure of the above described embodiments and concepts. Turning next to FIGS. 1 and 2, a twin cyclone configuration is illustrated, although we refer to this as a cyclone 120. The cyclone 120 includes a pair of the first or upper portion 122 and a respective pair of the second or lower portion 124. We describe the cyclone 120 herein by reference to the parts that make up each of the two twin cyclones, it being understood that the description applies to both of the twin cyclones (and alternatively to a single cyclone embodiment). The upper portion 122 and the lower portion 124 are joined by an articulation 126 which we later refer to herein as the first articulation to distinguish it when an optional second articulation may be used as described hereinbelow. The cyclone 120 is aligned along a first axis Y in the operational position. The first axis may be but need not be the vertical axis.

The cyclone 120 in general may be realized in the form of a shell 128 that is formed from a suitable material. For example, the cyclone 120 may be made with stainless steel, but many other materials optionally may be used as needed. The cyclone 120 includes a cylindrical shell 130 and a conical shell 132. The cylindrical and conical shells 130, 132 may be single piece constructs that are joined together by any suitable means, for example welding, along the transition 134. In an alternative embodiment as noted above, the articulation 126 may be located at the transition 134, which would replace a welded or other fixed joint. It will be noted that in the twin cyclone configuration illustrated, each conical shell is not necessarily in the form of a right circular cone as is the case typically in a single cyclone configuration (see FIG. 12). In twin cyclone configurations, such as shown for example herein, each conical shell 132 may be in the form of an oblique circular cone. Alternatively, other conical configurations or other geometries may be used as needed.

Figure 3:
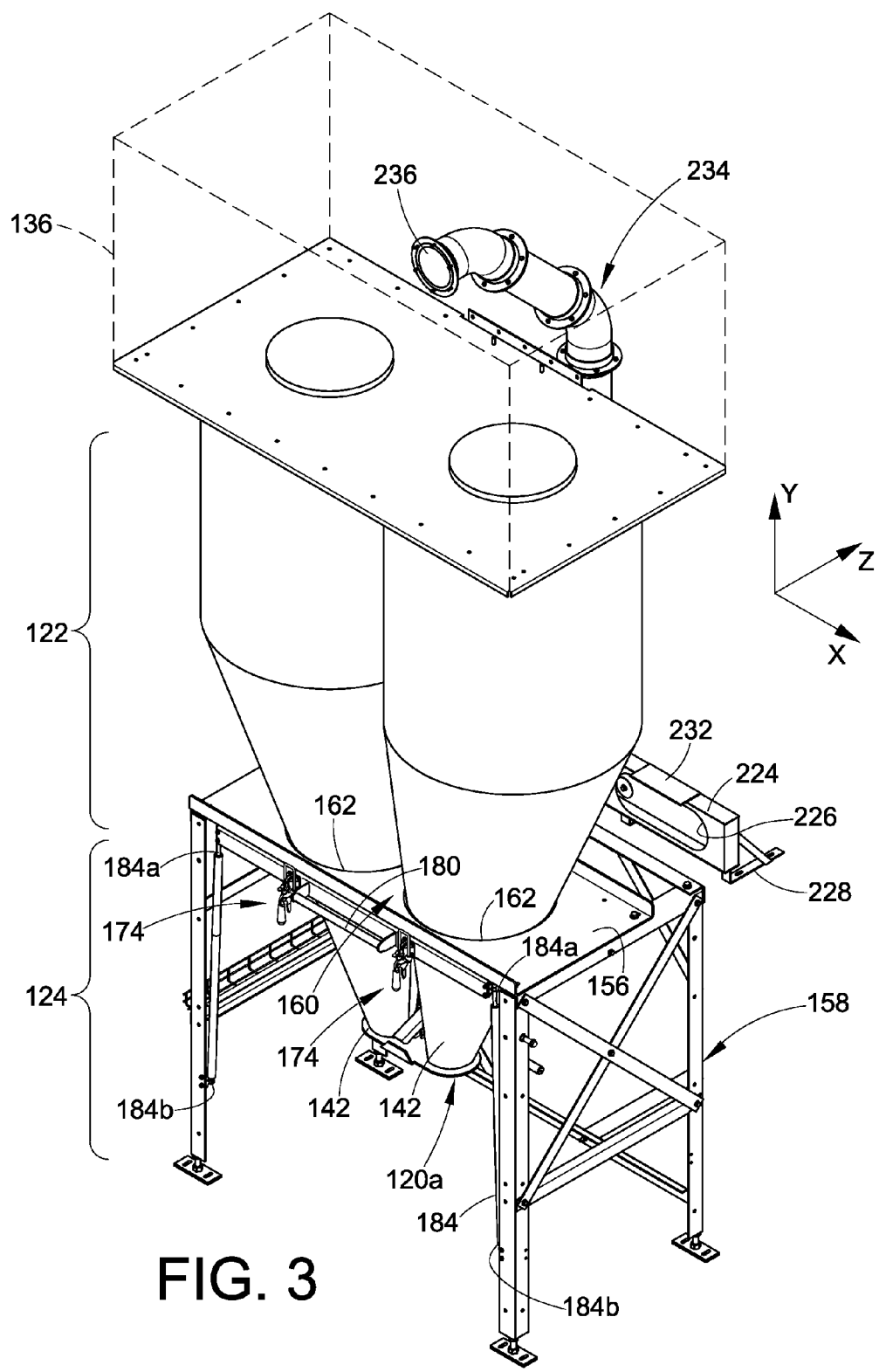
FIG. 3 is a perspective elevation of the embodiment of FIG. 1 with the cyclone supported on a frame, with a powder transfer pan or interface being omitted for clarity.

Each cylindrical shell 130 may have an open circular top end (FIG. 3). The top ends of the cylindrical shells 130 are open to an exhaust plenum 136 which is also known as a banjo in the art. The exhaust plenum 136 as part of the exhaust section 114 provides an interface between the cyclone 120 and the after filter and blower system 23 (22, 24 FIG. 12) as is well known. The exhaust plenum 136, therefore, is under negative pressure or suction that pulls large volume air through the cyclone 120. This air flow pulls oversprayed powder entrained air from the spray booth (12 FIG. 12) into the cyclone upper works through a cyclone intake 138 (FIG. 2) as is well known.

The conical shell 132 may be provided in two sections, namely a conical upper section 140 and a conical lower section 142. The articulation 126 provides a flexible or pivotable mechanical connection between the conical lower section 142 and the conical upper section 140. The conical upper section 140 and the associated cylindrical shell 130 form the cyclone upper portion 122 which is stationary relative to the vertical axis Y due to the interconnection with the exhaust plenum 136 and the duct work 26 (FIG. 1A) that connects the exhaust section 114 to the after filter and blower. The articulation 126 allows the conical lower section 142 to be moved to a first position illustrated in FIGS. 1 and 2 in which the cyclone 120 is in an operational configuration, meaning that the cyclone 120 will generate a vortex when air is pulled through the cyclone by the fan 22, and will operate to separate entrained powder from an air flow that enters the cyclone intake 138. The articulation 126 also allows the conical lower section 142 to be moved to a second position (see FIGS. 5, 7 and 10) in which the conical lower section 142 has been pivoted away from the conical upper section 140. This movement of the conical lower section away from the first position towards the second position causes the cyclone vortex to be interrupted.

The cyclone 120 may optionally include a powder transfer interface 144. It is important to note that in FIG. 3 we show an embodiment in which there is no indicated powder transfer interface 144. FIG. 3 thus shows an additional embodiment of the first concept noted hereinabove, in which a cyclone comprises an upper portion and a lower portion joined together by an articulation. To the extent that other embodiments may alternatively include a mechanism or arrangement to recover powder that is separated by the cyclone and exits through the cyclone outlet 120a, such mechanisms are optional design choices.

The powder transfer interface 144 may be used to provide a volume or space that receives the separated powder that falls downward through the open lower end 120a of each conical shell 132 of the cyclone; these openings thus present a cyclone outlet 120a of the cyclone separator. The cyclone outlet 120a for a twin cyclone as depicted includes the open bottom ends of both conical shells 132. A suction fitting 146 may optionally be provided that is connected to a pump 148 or other suction device via a powder hose 150. The pump 148 may be used to draw away the separated powder from the powder transfer interface 144 and transfer the separated powder to a powder recovery arrangement 152, which may be, for example, a supply hopper, waste receptacle, a sieve or to be otherwise disposed.

Figure 4:
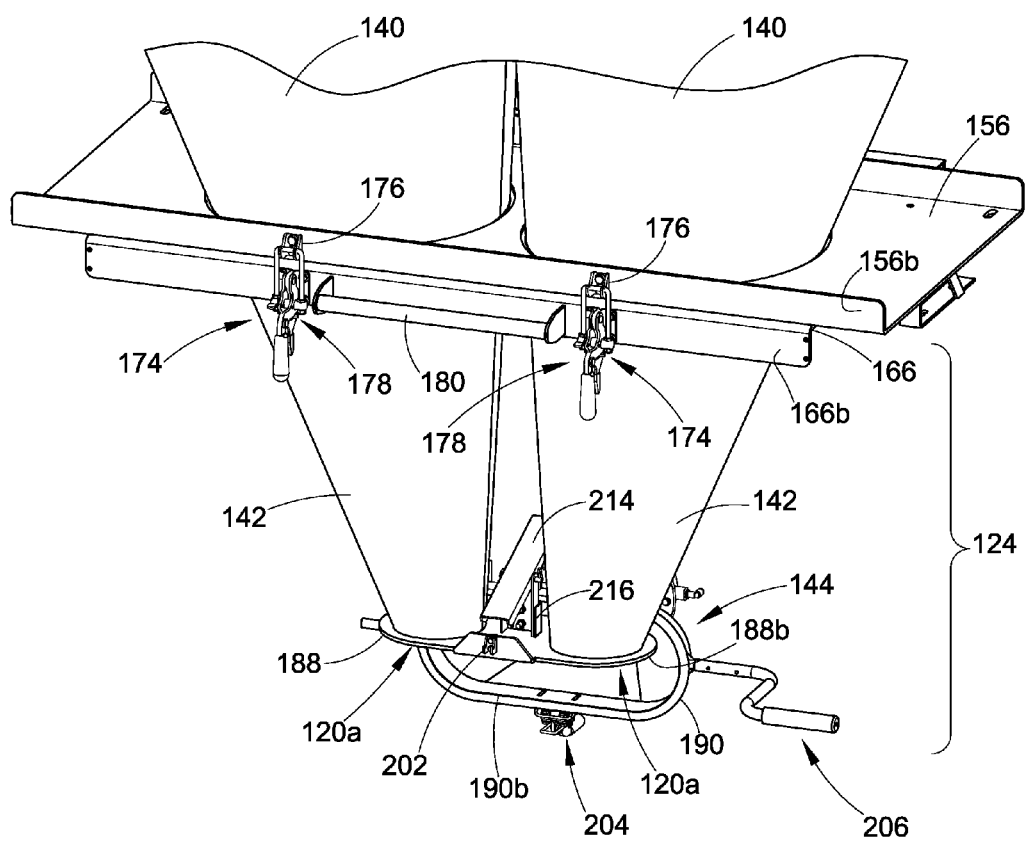
FIG. 4 is an enlarged perspective elevation of an articulation used in the embodiment of FIG. 1 with a cyclone lower portion in a first or operational position and a powder transfer interface in a released position.

An optional second articulation 154 (FIGS. 2 and 7) may be used to provide a flexible or pivotable mechanical connection between the powder transfer interface 144 and the conical lower section 142. The second articulation 154 allows the powder transfer interface 144 to be moved to a first position as illustrated in FIG. 1 which allows the powder transfer interface 144 to receive separated powder during normal cyclone 120 operation. The second articulation 154 also allows the powder transfer interface 144 to be moved or pivoted to a second position (FIG. 7) in which the cyclone outlet 120a, which is at the lower open end of the conical shell 132, is presented in an open and accessible position that is not obstructed by the powder transfer interface 144. Note that FIG. 4 illustrates the powder transfer interface 144 in an intermediate position between the first position shown in FIG.

1 and the second position shown in FIG. 7, as will be described more fully hereinafter.

With reference to FIGS. 3-7, we next describe more detail of the first articulation 126. This articulation may also be used, for example, with the embodiment of FIG. 1A. Moreover, these embodiments are exemplary and should not be construed in a limiting sense. Many different articulation concepts may be used to provide a flexible or pivoting mechanical connection between the cyclone upper portion 122 and the cyclone lower portion 124.

A first or upper flange 156 may be provided to support the cyclone upper portion 122 on a frame 158. The cyclone upper portion 122 has a lower end 160 that is welded to the first flange 156, as at weldment 162. The first flange 156 may therefore be considered to be an integral part of the cyclone upper portion 122.

The cyclone lower portion 124, and more particularly the conical lower section 142, has an upper end 164 that is welded to a second flange 166. The second flange 166 may therefore be considered to be an integral part of the cyclone lower portion 124.

Figure 7A:
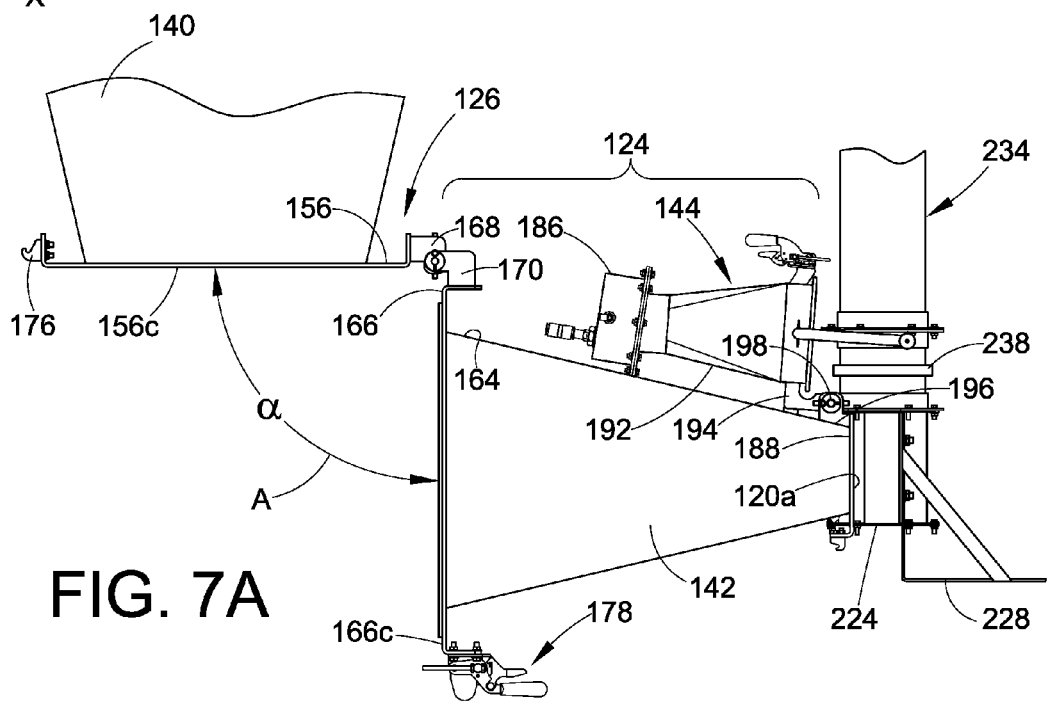
FIG. 7A is a side elevation of a cyclone lower portion in a second or cleaning position.

The first articulation 126 provides a pivotable mechanical connection between the cyclone upper portion 122 and the cyclone lower portion 124. This mechanical connection may take on many different designs, configurations and functionality as needed. In one embodiment, and as illustrated in FIGS. 2, 7 and 7A, the first articulation 126 may be realized in the form of pivot arms that are linked together by a pivot rod. A first pair of pivot arms 168 are attached to a back end 156a of the first flange 156 and axially spaced apart sufficiently to provide adequate support of the cyclone lower portion 124. A second pair of pivot arms 170 are attached to a back end 166a of the second flange 166 and also axially spaced apart in relatively close proximity to the first pair of pivot arms 160. A pivot rod 172 is received through holes in the first and second pairs of pivot arms 168, 170 so that the pivot rod 172 and the pairs of pivot arms provide the main load bearing support for the cyclone lower portion 124, and the mechanical connection between the first flange 156 (and hence the cyclone upper portion 122) and the second flange 166 (and hence the cyclone lower portion 124). Sufficient spacing is provided between the pivot rod 172 and the associated pivot arms 168, 170 so that the articulation 126 allows for free pivoting movement and rotation of the cyclone lower portion 124 about the axis of the pivot rod 172. In this example, the axis of the pivot rod 172 may conveniently be parallel with the X axis. It will be noted that the first articulation 126 provides a standoff on the Y and Z axes between the cyclone upper portion 122 and the cyclone lower portion 124 so as to allow the lower portion 124 to be swung up into alignment with the upper portion 122 when the cyclone 120 is configured in the operational position. The cyclone operational position is such as illustrated in FIG. 1. The movement between the first position and the second position for the cyclone lower portion 124 relative to the fixed position cyclone upper portion 122 (fixed position being relative to the cyclone lower portion 124) is represented by the arrow A in FIG. 7A.

Figure 6:
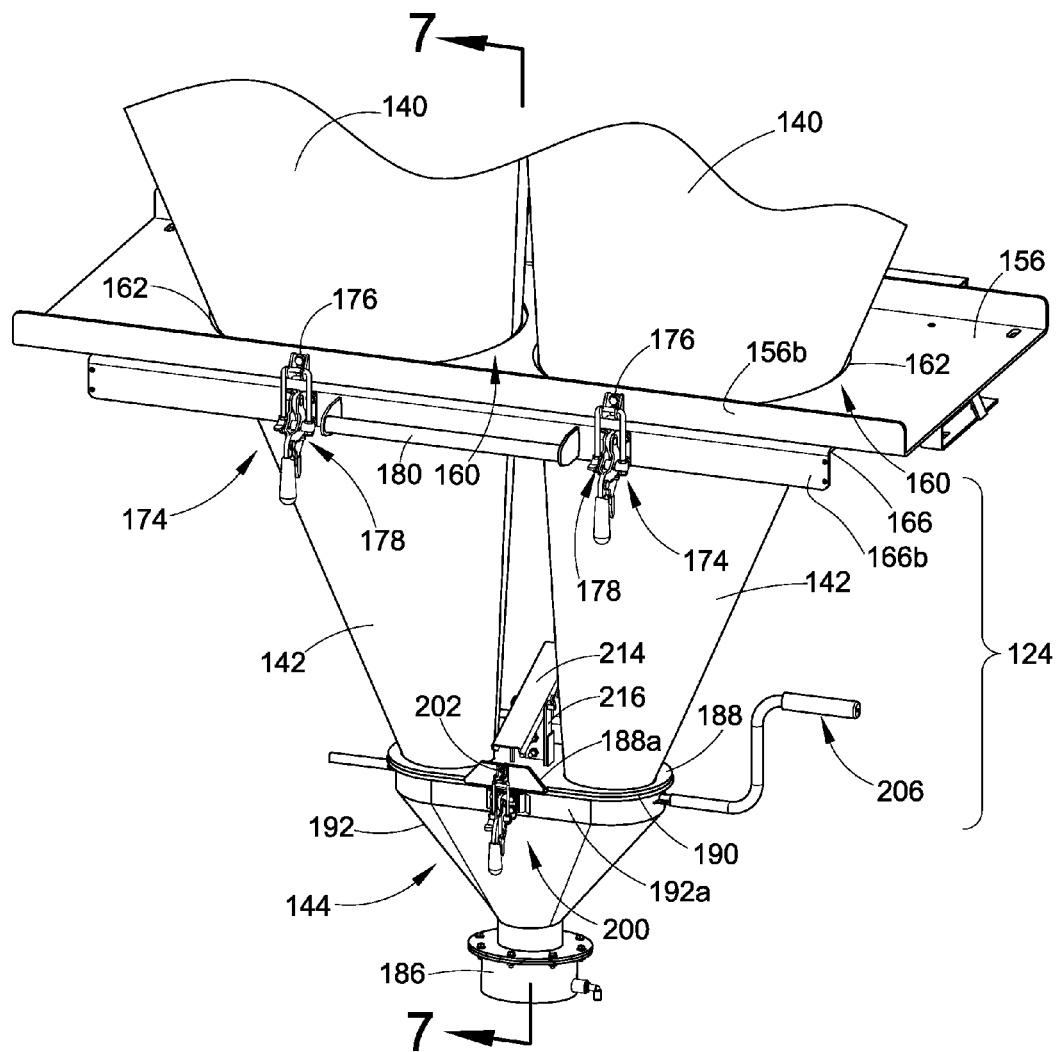
FIG. 6 is a view similar to FIG. 4 but with a powder transfer interface in a latched position.
Figure 7:
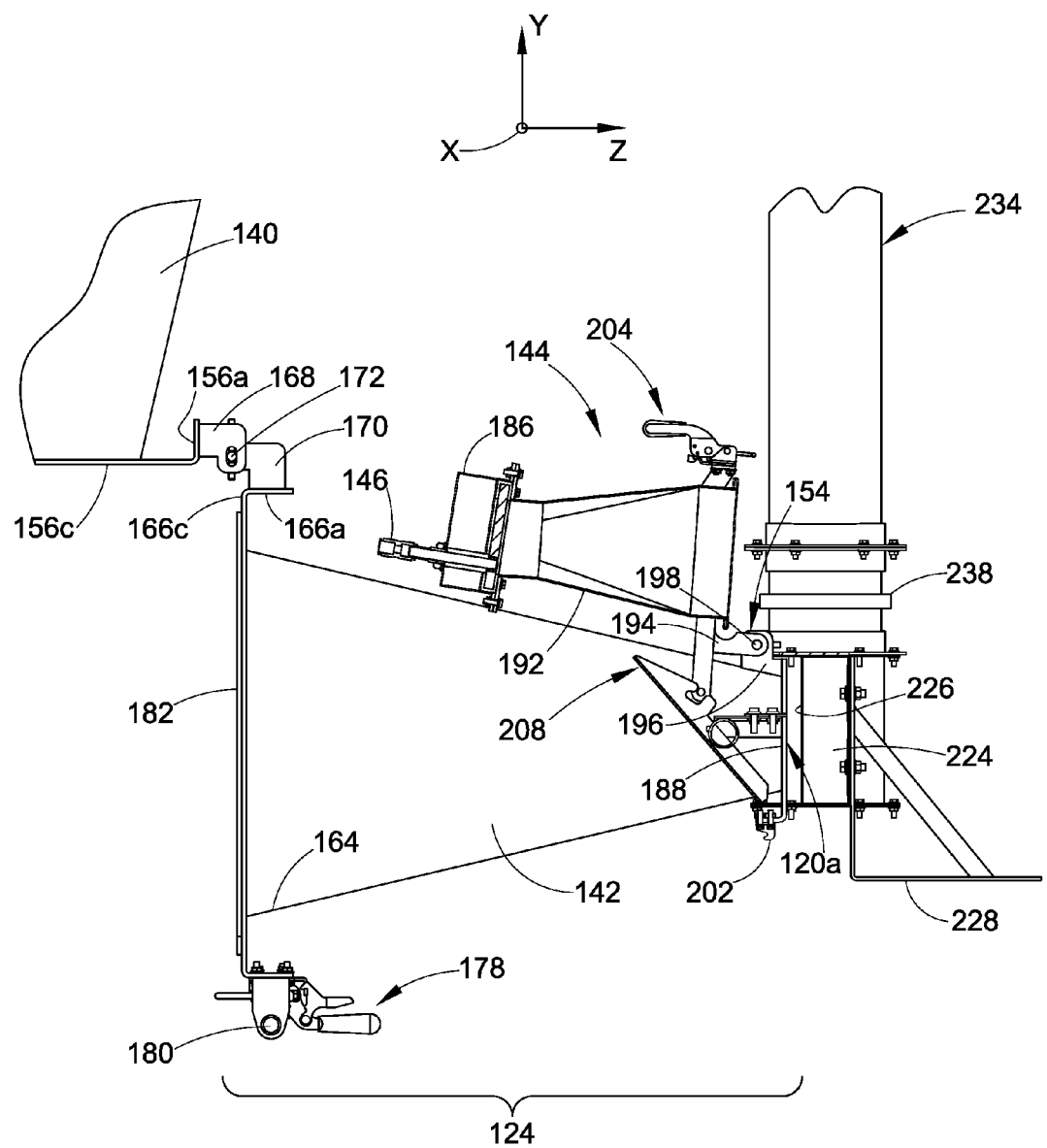
FIG. 7 is a side elevation of a cyclone lower portion in a second or cleaning position, taken along a vertical section between first and second conical lower sections.

With reference to FIGS. 6 and 7, a pair of latch assemblies 174 may be provided at the front of the cyclone 120. These latch assemblies 174 may be used to support the cyclone lower portion 124 when the lower portion 124 has been moved or rotated into the vertical position and in alignment with the cyclone upper portion 122. Each latch assembly 174 may be realized, for example in the form of a hook 176 and pull latch 178, but many different connections may be used to achieve the same function and result. The hooks 176 are attached to a front end 156b of the first or upper flange 156 and the pull latches 178 may be attached to a front end 166b of the second or lower flange 166. An operator handle 180 may also be mounted on the second flange 166 so that an operator can manually swing the cyclone lower portion 124 away from the cyclone upper portion 122 by the pivoting movement about the X axis provided by the pivot rod 172.

When the cyclone 120 is in an operational position such as depicted in FIG. 1, the first flange 156 and the second flange 166 provide flat facing surfaces 156c and 166c that interface with a close or zero gap when the latch assemblies 174 are closed. This close or zero gap interface allows for the cyclone 120 to generate the needed air flow and vortex for operation. An optional gasket 182 may be provided (FIG. 5) between the facing surfaces to further enhance or provide a sealed interface between the facing surfaces 156c and 166c. The close or zero gap or optionally sealed interface also removes any need for access doors for the cyclone, which are commonly provided in the prior art to allow an operator to clean the interior surfaces of the cyclone. Opening the access doors of the prior art does not interrupt the vortex and also provides rather limited access to the cyclone interior for cleaning.

Due to the articulation 126 being on one side of the cyclone 120, when the latch assemblies 174 are released, the weight of the cyclone lower portion 124 under the force of gravity will cause the cyclone lower portion 124 to swing down. In some designs, this weight may be sufficiently large so that an operator would have to hold onto the handle 180 to allow the cyclone lower portion 124 to move in a controlled manner. To assist this function, we optionally provide gas springs 184 that are connected between the support frame 158 and the second or lower flange 166. The optional gas springs are only illustrated in FIGS. 3 and 10. The gas springs 184 are pivotally mounted at each end to the frame 158 and the second or lower flange 166 so that as the cyclone lower portion 124 pivots or rotates about the pivot rod 172, the gas springs balance the forces needed for the rotation and function as an optional and additional load bearing support for the cyclone lower portion 124, particularly during movement of the cyclone lower portion. For example, as the cyclone lower portion 124 rotates away from a first or vertical position depicted in FIG. 1 (after the latch assemblies 174 are released), the gas springs 184 will retard the movement somewhat so that the cyclone lower portion 124 rotates away more slowly, as compared to the speed it would drop if the gas springs 184 were absent. The gas springs 184 optionally may also be used to support the cyclone lower portion 124 in a slightly open position and prevent the cyclone lower portion 124 from dropping due to gravity. The operator in this case then provides additional force to swing the cyclone lower portion 124 towards the second position.

The gas springs 184, by virtue of their concurrent rotation about their pivot joints 184a and 184b, provide an assisting force to complete the rotation of the cyclone lower portion to a second position used for cleaning operations. The second position is depicted, for example, in FIGS. 7 and 7A. The second position may be achieved, for example, by ninety degrees of rotation from the first position, so that in the second position the cyclone lower portion 124 is horizontal or aligned parallel with the Z axis. The second position need not be at ninety degree rotation but may be at another position as needed for a particular application. The gas springs 184 not only may assist in the rotation to the second position, but may provide enough energy that the operator need not apply any force or little force to complete the movement. Similarly, when the cyclone lower portion 124 is to be moved or rotated to the first position, the gas springs 184 can operate to provide the energy needed to raise the cyclone lower portion 124 into the vertically aligned position depicted in FIG. 1; or alternatively the gas springs 184 can be used to support the cyclone lower portion 124 slightly away from the cyclone upper portion 122 and the operator then applies additional force to complete the movement of the cyclone lower portion into the vertically aligned position depicted in FIG. 1. The gas springs 184 may be used to support the cyclone lower portion 124 in the second or cleaning position. Additional or alternative mechanisms may be used (for example, releasable latch mechanisms) to support the cyclone lower portion 124 in the cyclone lower portion second position.

Figure 8:
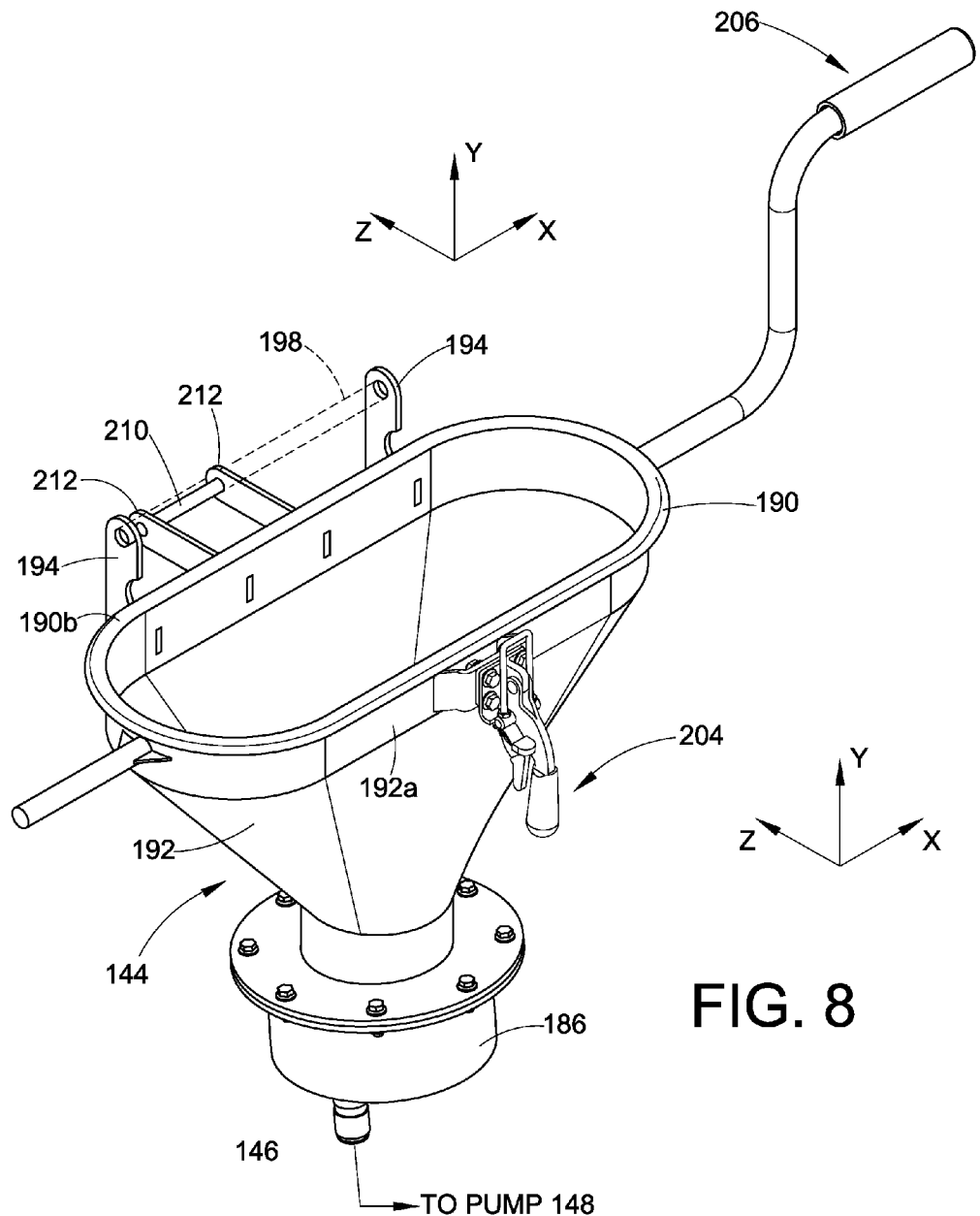
FIG. 8 is a perspective of an embodiment of a powder transfer interface 144.

With reference next to FIGS. 2, 4, and 6-8, the optional powder transfer interface 144 may be realized in many different forms and functions. In one embodiment herein, the powder transfer interface 144 may include a transfer pan 186 that can be positioned below the cyclone outlet 120a. The cyclone conical shell 132 may include an outlet flange 188 that is welded to the bottom of the cyclone conical shell 132, such as at the bottom end of the conical lower section 142. The transfer interface 144 may also include a pan flange 190. In the embodiment of FIG. 8 the transfer interface 144 may include a funnel-like portion 192 (funnel for short) that directs the separated powder down into the transfer pan 186.

The second articulation 154 provides a pivotable mechanical connection between the cyclone lower portion 124 and the powder transfer interface 144. This mechanical connection may take on many different designs, configurations and functionality as needed. In one embodiment, the second articulation 154 may be realized in the form of pivot arms that are linked together by a pivot rod. A third pair of pivot arms 194 (the first two pairs of pivot arms were described above with respect to the first articulation 126) are attached to a back side 192a of the funnel 192 and axially spaced apart sufficiently to provide adequate support of the powder transfer interface 144. A fourth pair of pivot arms 196 are attached to a back side 188a of the outlet flange 188 and are also axially spaced apart in relatively close proximity to the third pair of pivot arms 194 (note that due to the orientation of the views in the drawings, only one of the fourth pair of pivot arms 196 is viewable). A second pivot rod 198 (shown in phantom in FIG. 8 because the second pivot rod 198 would also pass through the fourth pair of pivot arms 196) is received through holes in the third and fourth pairs of pivot arms 194, 196 so that the second pivot rod 198 and the third and fourth pairs of pivot arms 194, 196 provide the main load bearing support for the powder transfer interface 144, as well as the mechanical connection between the outlet flange 188 (and hence the cyclone lower portion 124) and the pan flange 190 (and hence the powder transfer interface 144). Sufficient spacing is provided between the second pivot rod 198 and the associated pivot arms 194, 196 so that the second articulation 154 allows for free pivoting movement and rotation of the powder transfer interface 144 about the axis of the second pivot rod 198. In this example, the axis of the second pivot rod 198 may conveniently be parallel with the X axis. It will be noted in FIG. 8, for example, that the second articulation 154 provides a standoff on the Y and Z axes between the cyclone lower portion 124 and the powder transfer interface 144 so as to allow the powder transfer interface 144 to be swung up into alignment with the cyclone lower portion 124 when the cyclone 120 is configured in the operational position such as illustrated in FIG. 1, for example.

With reference to FIGS. 4, 6, 8 and 9, an outlet latch assembly 200 may be provided at the front lower end of the cyclone 120. The outlet latch assembly 200 may be used to support the powder transfer interface 144 when the powder transfer interface 144 has been moved or rotated into the vertical position and in alignment with the cyclone lower portion 124 (see FIG. 6 for example). The outlet latch assembly 200 may be realized, for example in the form of a hook 202 and a pull latch 204, but many different connections may be used to achieve the same function and result. The hook 202 may be attached to a front end 188a of the outlet flange 188 (see FIG. 9) and the pull latch 204 may be attached to a front face 192a of the funnel 192. A second operator handle 206 may also be mounted on the funnel 192 so that an operator can manually swing the powder transfer interface 144 away from the cyclone lower portion 124 by the pivoting movement about the X axis provided by the second pivot rod 198. FIG. 4 illustrates the powder transfer interface 144 in a lowered position, hanging under the force of gravity, after the outlet latch assembly 200 has been released.

When the cyclone 120 is in an operational position such as depicted in FIG. 1, the outlet flange 188 and the pan flange 190 provide flat facing surfaces 188b and 190b that provide a close or zero gap when the outlet latch assembly 200 is closed. This close or zero gap allows for the cyclone 120 to generate the needed air flow and vortex for operation and contains the separated powder within the transfer interface 144 volume. An optional gasket (not shown) may be provided between the facing surfaces to further enhance or provide a sealed interface between the facing surfaces 188b and 190b.

Figure 9:
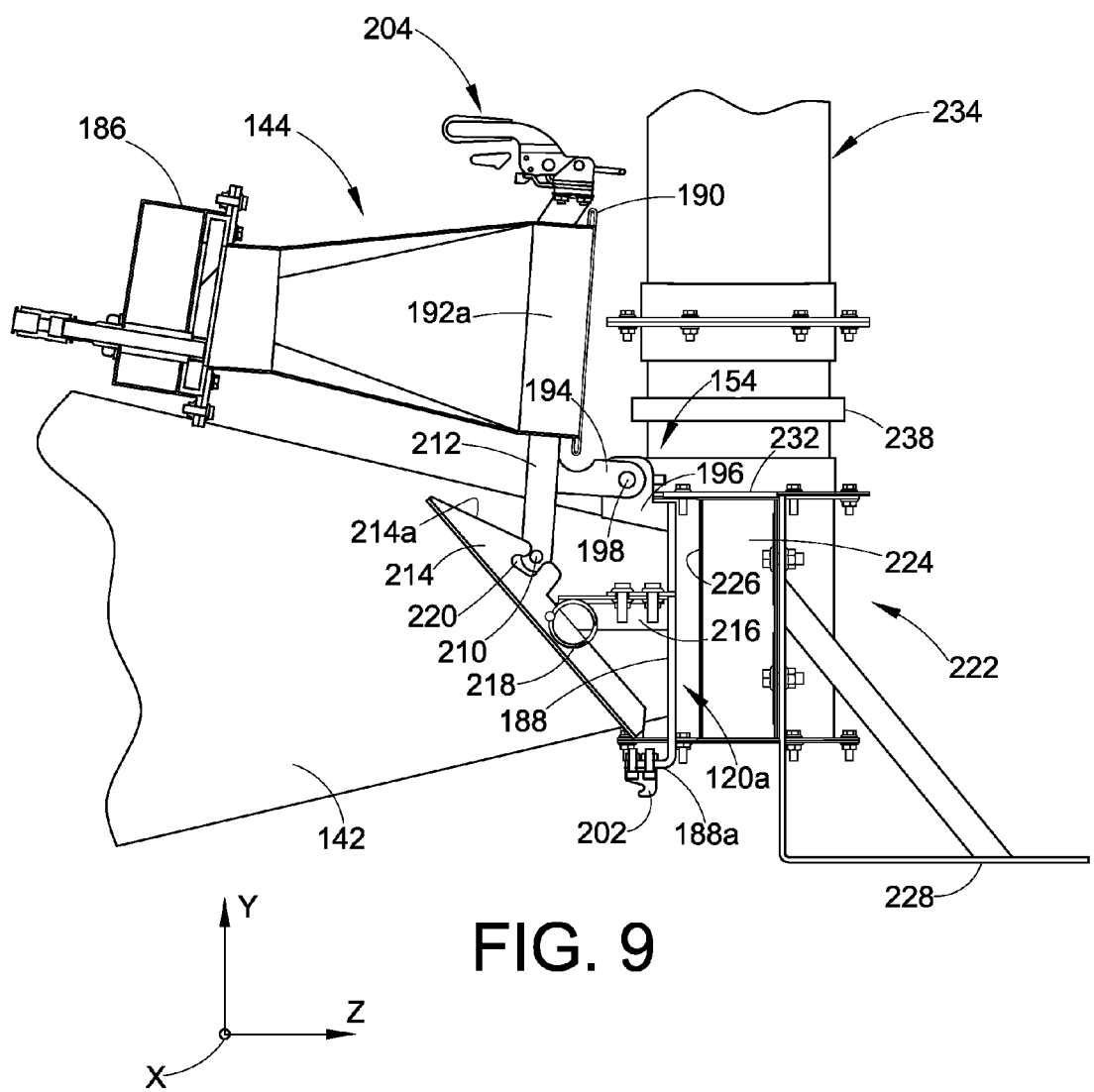
FIG. 9 is an enlarged view of FIG. 7A.
Figure 10:
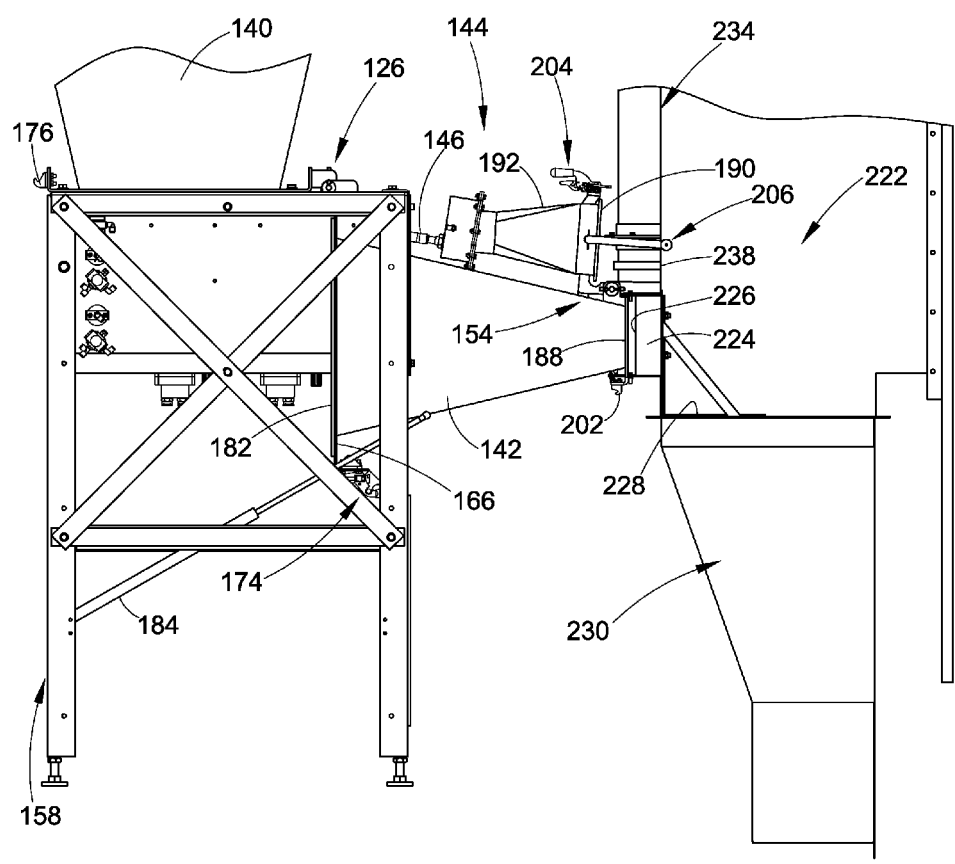
FIG. 10 is a side elevation of the arrangement of FIG. 3 with a cyclone lower portion in a second or cleaning position.
Figure 11:
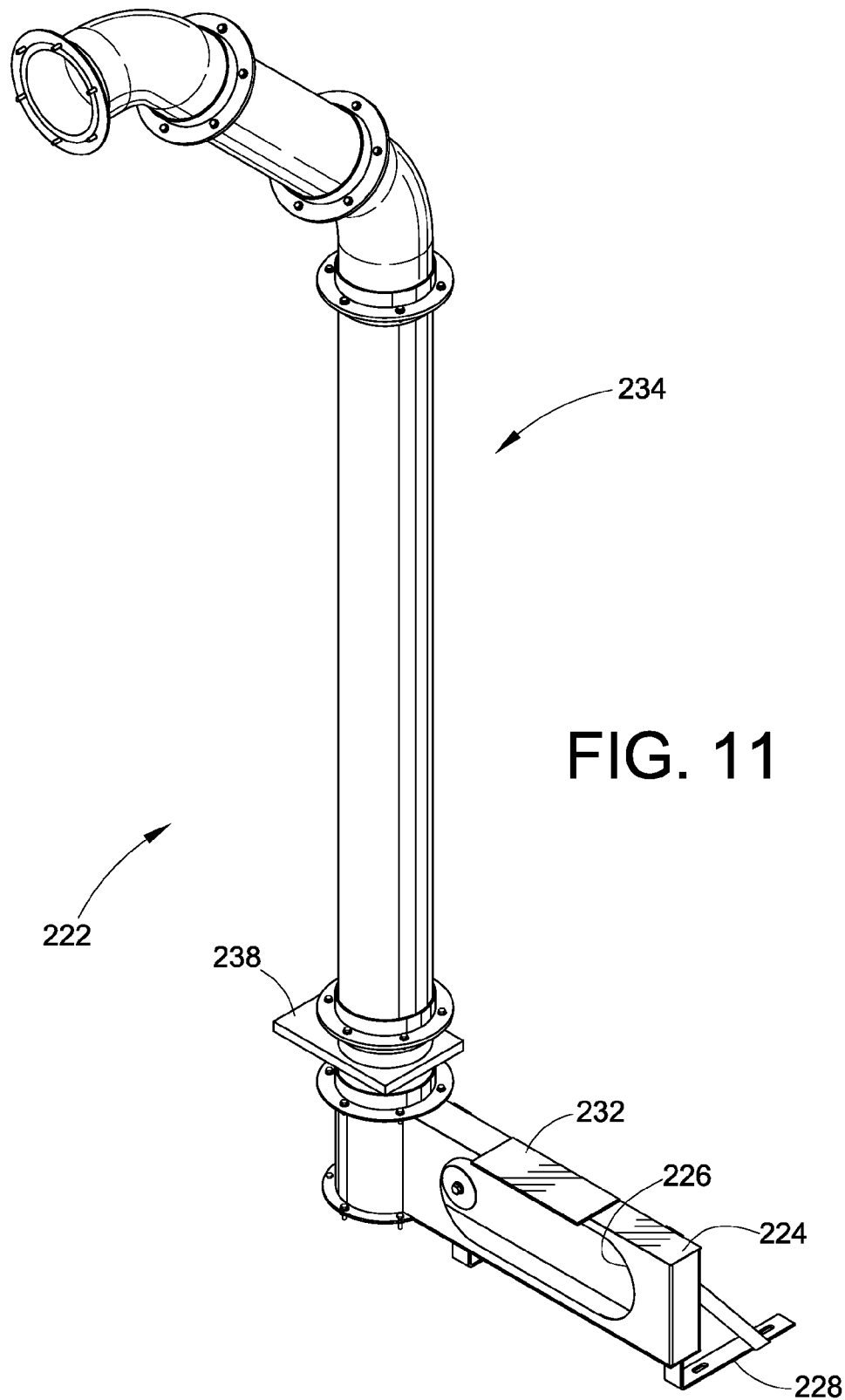
FIG. 11 is a perspective of a suction mechanism.

One of the reasons we want to swing the powder transfer interface 144 away from the cyclone outlet 120a is to be able to present the outlet 120a to a suction mechanism during cleaning after the cyclone lower portion 124 has been swung away from the cyclone upper portion 122, as shown in FIGS. 7 and 10 for example. But in this exemplary embodiment, the powder transfer interface 144 is free swinging after release of the outlet latch assembly 200. This would make it difficult to move the cyclone lower portion 124 into the second or, for example, the ninety degree position for cleaning operations. Therefore, we optionally provide a releasable latch 208 (see FIGS. 7 and 9).

With reference to FIGS. 7, 8 and 9, the releasable latch 208 may be realized in many different forms and function. In one embodiment, we use a latch bar 210 that is mounted to the funnel 192 just below the second pivot rod 198 (FIG. 8) using latch bar arms 212. A latch hook arm 214 (FIG. 9) is pivotally attached to a standoff 216 that is mounted on the outlet flange 188. A bias spring 218 or other suitable biasing member may be used to hold the latch hook arm 214 in the latched position. When the powder transfer interface 144 is swung away from the operational position as in FIG. 1, to the cleaning position shown in FIG. 9, the latch bar 210 will engage a tapered surface 214a of the latch hook arm 214, and pushes the latch hook arm against the force of the bias spring 218 until the latch bar 210 engages a retaining recess 220. The releasable latch 208 thus holds the powder transfer interface 144 in the cleaning position such as shown in FIG. 9 until the operator lifts the latch hook arm 214 to release the latch bar 210, which allows the powder transfer interface 144 to be moved back to the operational position of FIG. 1 and latched in place using the outlet latch assembly 200. In the cleaning position in FIG. 9, the powder transfer interface 144 is no longer obstructing the cyclone outlet 120a. This completely opens and presents the cyclone outlet 120a to the suction mechanism described below.

When an operator is going to change the cyclone 120 from the operational position of FIG. 1 to the cleaning position of FIG. 9, the powder transfer interface 144 is first moved to the cleaning position of FIG. 9 and latched in place using the releasable latch 208. Then the cyclone lower portion 124 can be more easily moved to the cleaning position.

With reference to FIGS. 2, 9, 10 and 11, a suction mechanism 222 includes a hood duct 224 having an hood duct opening 226 that is large enough to interface with the cyclone outlet 120a. The hood duct 224 may be supported by an angled flange 228 which may be mounted to a rigid structure such as part of the exhaust system 230 (FIG. 10) or other suitable structure. For the embodiment in which the cyclone outlet 120a is moved or swung from a horizontal plane, such as when the conical lower section 142 is in the first position, to a second position that is ninety degrees from vertical and thus lies in a vertical plane, the hood duct opening 226 may also be presented in a vertical plane so as to register with the cyclone outlet 120a in the cleaning position. If a different angle other than ninety degrees of rotation to the second position is alternatively needed, the plane of the hood duct opening 226 may be selected so as to register with the cyclone outlet 120a when the cyclone outlet 120a is in the second or cleaning position.

When the cyclone lower portion 124 has been swung into the cleaning position such as in FIG. 9, which in this example is a ninety degree position from the operational position of FIG. 1, the cyclone outlet 120a is presented to the hood duct opening 226. Preferably, the cyclone outlet 120a is swung into close proximity to the hood duct opening 226 so that powder that is blown off of the conical lower section 142 interior surfaces will be sucked up into the suction mechanism 222. A sealed interface between the hood duct opening 226 and the cyclone outlet 120a may be used if desired but we have not found such to be necessary in all cases. An overhang plate 232 may be used as a reference stop that engages the outlet flange 188 so as to register the cyclone outlet 120a with the hood duct opening 226, it being recalled that in one embodiment the gas springs 184 may be used to move the cyclone lower portion 124 into the cleaning position without needing operator control.

The hood duct 224 is connected to a first end of a conduit or pipe assembly 234 that is connected at a second end to an opening 236 in the exhaust plenum 136 (FIG. 1). The exhaust plenum 136 is connected to an after filter blower system (FIG. 12) which includes a fan 22 (FIG. 12) that is used to maintain a suction condition within the exhaust plenum 136 and draw from the cyclone 100 and into the after filter 24 (FIG. 12) any oversprayed powder that is not recovered by the cyclone 100. The after filter 24 collects this residual powder from the airflow that is used to transport the oversprayed powder from the spray booth 12. In this manner, the suction created in the exhaust plenum 136 by the fan 22 in the after filter and blower system will also create a suction condition at the hood duct 224 so that powder that is blown off of the conical lower section 142 interior surfaces will be sucked up into the exhaust plenum 136 and out to the after filter 24. An optional manual slide gate 238 may be provided in the vertical pipe assembly 234 so that when the cyclone 120 is in the operational position of FIG. 1, the suction in the exhaust plenum 136 is isolated from the hood duct 224. Where slide gate 238 is used, when the cyclone lower portion 124 is moved into the cleaning position where it is aligned with hood duct 224, the slide gate would be moved to the open position to transfer the suction condition within the exhaust plenum 136 through the pipe assembly 234 to the hood duct 224 and the cyclone lower portion 124. In this way, when the cyclone lower portion 124 is cleaned of oversprayed powder coating material with compressed air, the dislodged powder is drawn from the cyclone lower portion 124 through the hood duct 224 and pipe assembly 234 into the exhaust plenum 136 and then to the after filters. For embodiments in which the cyclone 120 is vertical in the first or operational position and the cyclone lower portion 124 is pivoted ninety degrees to the second or cleaning position, the pipe assembly 234 may optionally also be vertically oriented.

With reference to FIGS. 1 and 10 we now describe how an operator may use and clean the cyclone 120. Assume that the cyclone 120 is in the operational position of FIG. 1, which we also refer to as the first position for the cyclone lower portion 124. As such, the blower and after filter draw powder entrained air into the cyclone 120, which generates an internal vortex such that the powder is separated from the air, with the latter passing up through the cyclone conical and cylindrical shells 132, 130 and out through the exhaust plenum 136. The separated powder falls down into the powder transfer interface 144 where it is removed by operation of the pump 148 or is otherwise disposed.

To begin a cleaning operation, such as for a color change, the operator will keep the blower and after filter system 23 turned on so that a substantial suction continues to be present in the exhaust plenum 136. The outlet latch assembly 200 is released and the powder transfer interface 144 including the transfer pan 186 pivots about the second articulation 154 and rotates away from the conical lower section 142 (see FIG. 4). The operator can use an air wand or other suitable cleaning device to blow off or otherwise clear away the interior and exterior surfaces of the powder transfer interface 144, for example the funnel 192 and the transfer pan 186, and the loosed powder will be sucked up into the cyclone 120. The operator then grasps the second handle 206 and further pivots the powder transfer interface 144 toward the back of the cyclone 120 until the releasable latch 208 engages the latch bar 210. This holds the powder transfer interface 144 up against the backside of the conical lower section 142. In such a position, the powder transfer interface 144 is in a generally vertical orientation although not exactly along the Y axis because of the conical shape of the conical lower section 142.

Next the operator releases the two latch assemblies 174 that hold the conical lower section 142 against the conical upper section 140 (in terms of the FIG. 1A embodiment, the conical lower section 142 corresponds to the cyclone lower portion 104 and the conical upper section 140 forms part of the cyclone upper portion 122). The gas springs 184 resist sudden dropping of the conical lower section 142, and may be positioned so that the gas springs initially only allow the conical lower section 142 to rotate about the first articulation 126 a small amount, for example, to provide a small gap of a few inches between the facing surfaces 156c, 166c (FIG. 7A). This small gap in some cases will not break the internal vortex of the cyclone 120. The operator may then use an air wand to blow off powder from the exterior and somewhat the interior surfaces of the conical lower section 142 if so desired. This may include blowing off the interface between the facing surfaces 156c and 166c as well as the gasket 182.

The operator grasps the first handle 180 and pulls down on the handle, which further rotates the conical lower section 142 about the first articulation 126. Sufficient rotation results in the internal vortex of the cyclone 120 being interrupted, however, substantial suction is still drawn up into the cylindrical shell 130 and the conical upper section 132 (which comprise the cyclone upper portion 120). The precise degree of rotation of the conical lower section 142 away from the first position and towards the second position that is needed to interrupt the vortex will vary depending on the overall design of the cyclone. It can be expected, however, that there will be a transition position at which the gap between the conical lower section 142 and the conical upper section 140 is large enough that the vortex can no longer be maintained and is interrupted. Although the vortex can be interrupted in this manner, the cyclone upper portion 122 still has a significant air flow up through the exhaust plenum 136 provided that the after filter and blowers are on.

During this articulating movement of the conical lower section 142 away from the first position, until the operator has pivoted the conical lower section 142 far enough that the gas springs 184 start to assist in the pivoting motion, the operator applies just enough force to overcome the resistance of the gas springs 184. As soon as the gas springs 184 start to assist the movement, the operator can release grip of the first handle 180 and the gas springs 184 will push on the conical lower section 124 to further rotate it about the first articulation 126. The gas springs 184 can rotate the conical lower section 142 until the outlet flange 188 engages the overhang plate 232 of the hood duct 224. This registers the cyclone outlet 120a, which was made accessible when the powder transfer interface 144 was rotated previously to the latched position. This is the second position of the cyclone lower portion 124 and also referred to herein as the cleaning position. This second position is ninety degrees of rotation about the first articulation 126 from the first or operational position. The angular rotation between the first position and the second position is chosen to be ninety degrees for convenience in that the cyclone lower portion 122 can be rotated to a horizontal position that aligns with the X axis from the first position that is vertical and aligns with the Y axis. This rotation to the cleaning or second position may occur for convenience about an axis, such as the horizontal axis X, that is normal to the vertical axis of the cyclone 120 in the operational or first position. The horizontal second position is convenient for registering and interfacing the cyclone outlet 120a with the vertically oriented exhaust stack or extraction system 230 via the hood duct 224. However, in other applications, the alignment of the cyclone outlet 120a with a suction mechanism 222 may be designed to occur at an angular rotation α (FIG. 7A) that is greater than or less than ninety degrees as needed.

Figure 5:
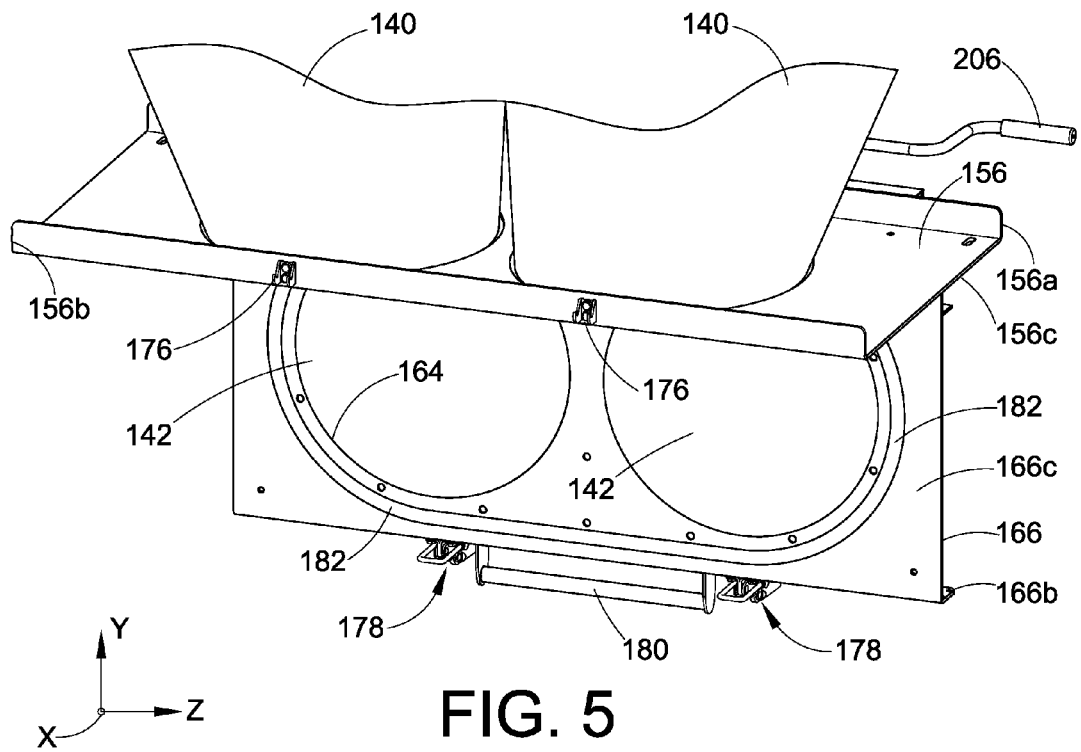
FIG. 5 is a an enlarged view in perspective of the view in FIG. 4 with a cyclone lower portion in a second or cleaning position.

From FIGS. 5 and 10 it will be apparent how the articulated connection between the cyclone upper portion 122 and the cyclone lower portion 124 facilitates cleaning. When the cyclone lower portion 124 is in the second or cleaning position, the operator has easy and clear access to the surfaces of the conical lower section 142, and the loosed powder is sucked up through the suction mechanism 222 into the exhaust plenum 136. The operator also has unobstructed visibility into the cyclone upper portion 122 for cleaning the interior surfaces, particularly the upper interior surfaces of the cylindrical shell 130 and the conical upper section 140.

After the cleaning operation is completed, the operator pulls on the first handle 180 to begin rotating the cyclone lower portion 124 (i.e. the conical lower section 142) in the opposite direction about the first articulation 126. When the rotation is sufficient to have the gas springs 184 assist in the movement, the operator can release grip of the first handle 180 and the gas springs 184 further rotate the cyclone lower portion 124 towards the first position of FIG. 1. The gas springs 184 can be designed so that they do not fully engage the first flange 156 against the second flange 166 but rather leaves a small gap. This may be used as a safety feature to prevent a pinch point. The operator can then use the latch assemblies 174 to complete the movement to the first position, which also re-establishes the internal vortex of the cyclone when the blower and after filter system is on. After the latch assemblies 174 are secured, the operator releases the latch hook arm 214 from the latch bar 210 and using the second handle 206 rotates the powder transfer interface 144 up to the position in FIG. 1 and operates the outlet latch assembly 200. The cyclone 120 is then again in the operational position of FIG. 1.

An embodiment of a method for cleaning a cyclone used in a powder recovery system as part of a powder coating system may include the steps of providing suction for the cyclone, swinging a lower portion of the cyclone away from an upper portion so that an outlet of the lower portion is presented to a suction mechanism, and removing powder from surfaces of the lower portion of the cyclone with the removed powder being drawn into the suction mechanism.

It is intended that the inventions not be limited to the particular embodiments disclosed for carrying out the inventions, but that the inventions will include all embodiments falling within the scope of the appended claims.

The invention claimed is:

1. A cyclone for a powder recovery system, comprising:
   a cylindrical portion and a conical portion alignable with each other along a vertical axis of the cyclone,
   said conical portion comprising a conical upper section and a conical lower section,
   said conical lower section being pivotally attached to said conical upper section by a joint,
   wherein said conical lower section is pivotable about said joint between a first position and a second position, said conical lower section being aligned with said conical upper section along said vertical axis when said conical lower section is in said first position, said conical lower section being aligned along a second axis that is different from said vertical axis when said conical lower section is moved from said first position to said second position,
   said conical lower section comprising an outlet that is in fluid communication with a suction mechanism when said conical lower section is in said second position.

2. The cyclone of claim 1 wherein said joint comprises a hinge joint.

3. The cyclone of claim 1 wherein, when said conical lower section is in said second position, vortex operation of the cyclone is interrupted.

4. The cyclone of claim 1 comprising a latch that releasably holds said conical lower section in said second position.

5. The cyclone of claim 1 comprising one or more gas springs to assist movement of said conical lower section between said first position and said second position.

6. The cyclone of claim 1 wherein said conical lower section is adapted to be moved manually between said first position and said second position.

7. The cyclone of claim 1 wherein said conical lower section comprises a powder transfer pan that is pivotally attached to said conical lower section by a second joint.

8. The cyclone of claim 7 wherein said powder transfer pan is pivotable about said second joint to a position that presents said outlet for alignment with said suction mechanism.

9. The cyclone of claim 8 wherein said suction mechanism is in fluid communication with a vertical exhaust stack that provides suction for the cyclone.

10. A cyclone for a powder recovery system, comprising:
    a first portion and a second portion alignable with each other along a first axis,
    said second portion being joined to said first portion by an articulation,
    said second portion being pivotable about said articulation between a first position and a second position,
    a lower end of said second portion comprises an outlet through which powder is removed from the cyclone, wherein when said second portion is in said second position, said outlet is in fluid communication with a suction mechanism.

11. The cyclone of claim 10 wherein said second portion being aligned with said first portion along said first axis when said second portion is in said first position, said second portion being aligned on a second axis that is different from said first axis when said second portion is moved from said first position to said second position.

12. The cyclone of claim 10 wherein when said second portion is in said second position, vortex operation of the cyclone is interrupted.

13. The cyclone of claim 10 wherein said first portion comprises a cylindrical shell and said second portion comprises a conical shell.

14. The cyclone of claim 13 wherein said conical shell comprises a conical upper section and a conical lower section that are joined together by said articulation.

15. The cyclone of claim 10, wherein said suction mechanism comprises a duct.

16. The cyclone of claim 15 wherein said duct comprises a duct opening, said outlet being registered with said duct opening when said second portion is in said second position.

17. The cyclone of claim 16 wherein said duct is in fluid communication with a first end of a pipe assembly, and said pipe assembly has a second end in fluid communication with an exhaust plenum of the cyclone.

18. The cyclone of claim 17 wherein at least a portion of said pipe assembly extends vertically.

\* \* \* \* \*